United States Patent [19]

Sudler

[11] 4,138,617

[45] Feb. 6, 1979

[54] SINGLE PHASE STEPPER MOTOR

[75] Inventor: Roland Sudler, Frankfurt am Main, Fed. Rep. of Germany

[73] Assignee: Quartz-Zeit AG, Frankfurt am Main, Fed. Rep. of Germany

[21] Appl. No.: 789,874

[22] Filed: Apr. 22, 1977

[30] Foreign Application Priority Data

May 13, 1976 [DE] Fed. Rep. of Germany ....... 2621262

[51] Int. Cl.$^2$ ............................................. H02K 37/00
[52] U.S. Cl. .................................. 310/49 R; 310/156; 58/23 D
[58] Field of Search .................. 310/41, 83, 156, 74, 310/162–165, 40 MM, 257, 49; 58/23 D

[56] References Cited

U.S. PATENT DOCUMENTS

| | | | |
|---|---|---|---|
| 2,265,781 | 12/1941 | Schweitzer, Jr. ..................... | 310/163 |
| 3,652,884 | 3/1972 | Vuffray ................................ | 310/257 |
| 3,803,433 | 4/1974 | Ingenito ........................... | 58/23 D X |
| 3,943,698 | 3/1976 | Ono .................................. | 310/156 X |

*Primary Examiner*—Donovan F. Duggan
*Attorney, Agent, or Firm*—Otto John Munz

[57] ABSTRACT

A single phase stepper motor is formed of a rotor having a shaft carrying a driving pinion and a permanent magnet and a stator having a body of diamagnetic or paramagnetic material, a field winding producing an excitation field transverse to the axis of the rotor shaft and a pair of diametrically opposed auxiliary poles spaced from the excitation field. The permanent magnet is constructed of a lanthanide ferromagnetic alloy, such as a lanthanide cobalt alloy and preferably a samarium cobalt alloy; and the permanent magnet has a moment of inertia substantially the same as or less than the moment of inertia of the combination of the rotor shaft and the driving pinion. The stator body has a plurality of pairs of holes therein for supporting a U-shaped, rod-like member having ends forming the auxiliary poles in a plurality of positions to permit adjustment of the direction of rotation and torque of the rotor.

11 Claims, 3 Drawing Figures

SINGLE PHASE STEPPER MOTOR

BACKGROUND OF THE INVENTION

1. Field of the Invention

The present invention pertains to single phase stepper motors and, more particularly, to such motors for driving clocks.

2. Discussion of the Prior Art

Single phase stepper motors formed of a bipolar permenent magnet rotor and a stator of a non-magnetic material having a field winding arranged parallel to the rotor shaft are known in the prior art. The stator of such prior art motors is surrounded by a ring of ferromagnetic material which is provided with two apertures constituting auxiliary poles. Although such single phase stepper motors were developed in an attempt to minimize current consumption, such motors suffer from the disadvantage of requiring too much power if a torque of the order of hundreds of millipound-centimeters is to be produced, such as is required for the second-hand shaft of a clock.

SUMMARY OF THE INVENTION

Accordingly, it is an object of the present invention to overcome the above-mentioned disadvantage of the prior art by providing a relatively small, single phase stepper motor supplying a relatively high torque while requiring a relatively small amount of current.

Another object of the present invention is to reduce the current consumption of a single phase stepper motor by constructing a permanent magnet for the rotor of the motor of a lanthanide ferromagnetic alloy such that the moment of inertia of the permanent magnet is substantially the same as the moment of inertia of the combination of the rotor shaft and a driving pinion including holding plates for the permanent magnet, if such are utilized.

An additional object of the present invention is to construct a permanent magnet of a single phase stepper motor of a lanthanide ferromagnetic alloy to produce a relatively high torque with small electrical power requirements, the reduced power requirement stemming from the reduction of the moment of inertia of the permanent magnet since the smaller such moment of inertia, the smaller the current consumption of the motor.

The present invention has a further object in the use of a permanent magnet in a single phase stepper motor made of a lanthanide cobalt alloy, preferably a samarium cobalt alloy, to produce maximum energy product (BH) max.

Yet another object of the present invention is to construct a single phase stepper motor utilizing a permanent manget having a moment of inertia smaller than the moment of inertia of the combination of the rotor shaft, a driving pinion and any holding means for the permanent magnet.

A further object of the present invention is to minimize the structural volume of a single phase stepper motor by utilizing a rod-like U-shaped member to form auxiliary poles mounted in a pair of holes in a stator body made of a material such as plastic.

The present invention has an additional object in that a plurality of pairs of holes are formed in a stator body of a single phase stepper motor such that a U-shaped pole-forming member can be supported at a plurality of locations to permit adjustment of the direction of rotation and the torque of a rotor.

Another object of the present invention is to divide a stator body of a single phase stepper motor along a plane transverse to the axis of a rotor shaft into two parts to permit bearing supports to be disposed within the stator body to reduce the structural volume of the motor and facilitate manufacture and assembly by reducing the number of components of the motor.

Some of the advantages of the single phase stepper motor of the present invention over the prior art are that the small moment of inertia permits precise stopping of the rotor without overshoot to any material extent thereby obviating the need for damping means as frequently required in prior art stepper motors, the rotor develops very little noise, the current consumption is particularly small while torque reduction due to the permanent magnet is compensated by an increase in the auxiliary poles, assembly and manufacture are relatively simple and inexpensive, and the size of the stepper motor is substantially reduced.

The present invention is generally characterized in a single phase stepper motor including a stator including a body of diamagnetic or paramagnetic material, a field winding disposed in the body for producing an excitation field, and two diametrically opposed auxiliary poles spaced from the excitation field; a rotor including a shaft carrying a driving pinion and a bipolar permanent magnet; and bearing means rotatably supporting the rotor in the stator body with the axis of the rotor shaft transverse to the direction of the excitation field, the permanent magnet being constructed of a lanthanide ferromagnetic alloy and having a moment of inertia substantially the same as the moment of inertia of the combination of the rotor shaft and the driving pinion.

Other objects and advantages of the present invention will become apparent from the following description of the preferred embodiment taken in conjunction with the accompanying drawings.

DESCRIPTION OF THE PREFERRED EMBODIMENT

Figure 1:
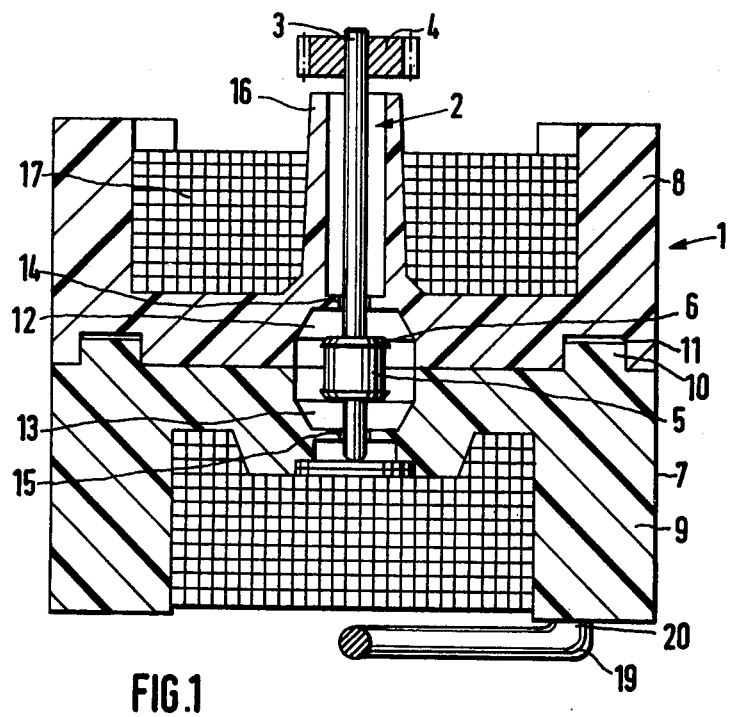
FIG. 1 is a longitudinal section of a single phase stepper motor according to the present invention.
Figure 2:
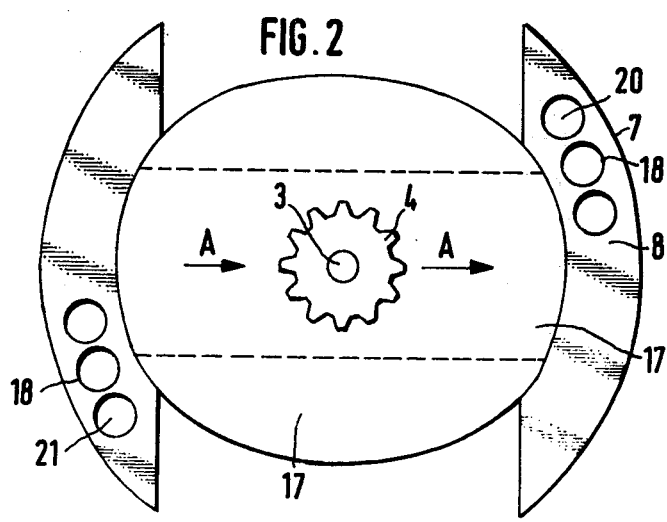
FIG. 2 is a plan view of the single phase stepper motor of FIG. 1.

A single phase stepper motor according to the present invention is illustrated in FIGS. 1 and 2 and includes, as basic components, a stator 1 and a rotor 2. The rotor 2 includes a steel shaft 3 carrying a driving pinion 4 mounted on one end and a bipolar permanent magnet 5 mounted adjacent the other end between holding plates 6. The permanent magnet 5 can be secured to the holding plates 6 in any suitable manner, such as by means of an adhesive. The moment of inertia of the permanent magnet 5 is substantially the same as or smaller than the moment of inertia of the combination of rotor shaft 3 and driving pinion 4 and holding plates 6 if such are used due, essentially, to the larger mass of the rotor shaft and the diameter of the holding plates 6.

The moment of inertia of the permanent magnet 5 is reduced by constructing the permanent magnet of a lanthanide ferromagnetic alloy to permit the motor to develop relatively high torque while requiring small electrical power consumption. More particularly, the permanent magnet is preferably constructed of a lanthanide cobalt alloy, such as a saramarium cobalt alloy in that by means of such alloys particularly high energy products (BH) max. can be produced. Samarium cobalt alloys, for example, have a maximum energy product (BH) max. in the range of 120 kJ/m$^3$.

The stator 1 includes a body 7 divided along a plane transverse to the axis of rotor shaft 3 to form two parts 8 and 9 connected together by pins 10 extending from part 9 and received in recesses 11 in part 8 such that the parts cannot rotate relative to one another. The body parts 8 and 9 are provided with facing recesses 12 and 13, respectively, forming a cavity for receiving the permanent magnet 5 and holding plates 6 of the rotor, and bearing supports 14 and 15 are disposed on opposite sides of the recesses 12 and 13 in body parts 8 and 9, respectively, for rotatably supporting the rotor shaft 3. A field winding 17 surrounds a tubular extension 16 through which the rotor shaft 3 passes, and the field winding 17 produces an excitation field transverse to the axis of rotor shaft 3.

The stator body 7 has a plurality of pairs of holes 18 therein for receiving a U-shaped rod-like member 19 having ends 20 and 21 forming diametrically opposed auxiliary poles for the stepper motor. A plane passing through the U-shaped element forms an angle of approximately 45° with the direction of the excitation field indicated by the arrows A, and the pairs of holes 18 are each symmetrically disposed relative to the excitation field. The stator body 7 is advantageously made of diamagnetic or paramagnetic material, such as a plastic material; and, the U-shaped member 19 combined with the two-part stator body facilitates assembly of the stepper motor. The U-shaped member 19 can be placed in any of the pairs of holes 18 in the stator body such that by simply changing the auxiliary poles formed by the U-shaped member from one pair of holes to another pair of holes, the direction of rotation of the stepper motor can be changed. When additional pairs of holes are provided, it is also possible, by altering the position of the U-shaped element, to adjust the torque supplied by the motor as well as the direction of rotation thereof.

Figure 3:
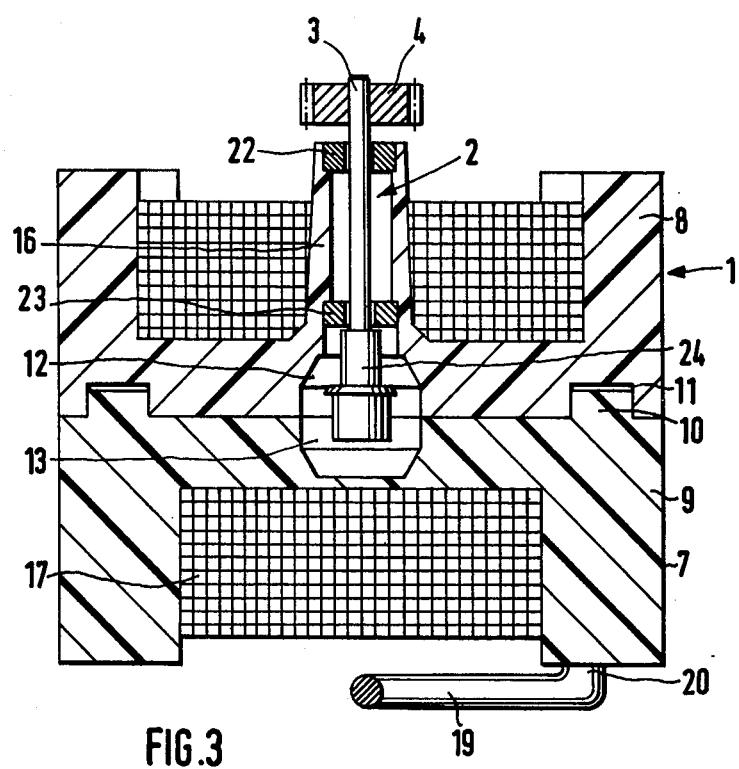
FIG. 3 is a longitudinal section of another embodiment of a single phase stepper motor according to the present invention.

Another embodiment of a single phase stepper motor according to the present invention is shown in FIG. 3 and differs from the embodiment of FIGS. 1 and 2 in the bearing supports for rotor shaft 3. Accordingly, parts in FIG. 3 identical to parts in FIGS. 1 and 2 are given the same reference numbers and are not described again.

Two bearing supports 22 and 23 are pressed into tubular extension 16 in longitudinally spaced relation, and the axial positioning of the rotor shaft 3 is implemented by driving pinion 4 and a holding member 24 to which the permanent magnet is secured. The support of the rotor shaft in bearings 22 and 23 has the advantages that only small radial movements of the rotor shaft can occur adjacent the driving pinion and, thus, noise is reduced and that assembly is simplified since only one part of the stator body is required to undergo additional working operations.

The stator in either embodiment of the present invention can be provided with an annular screen of ferromagnetic material such that not only is the starting voltage reduced but adverse effects on the single phase stepper motor by ferromagnetic objects near the motor are eliminated.

A single phase stepper motor constructed according to FIGS. 1 and 2 can have a diameter of 10 mm and supplies at the second hand shaft of a clock a torque of 0.3 pcm while the required starting voltage is 0.4 v. The low starting voltage permits the motor to be supplied with electrical power from small batteries and other sources of energy not usable for the driving of prior art stepper motors, e.g., solar cells.

From the above, it will be appreciated that by constructing the permanent magnet 5 of a lanthanide ferromagnetic alloy, preferably a lanthanide cobalt alloy such as a samarium cobalt alloy, the moment of inertia of the permanent magnet is reduced to the area of the moment of inertia of the combination of the rotor shaft and driving pinion and any holding means for the permanent magnet if such are used. This reduction in the moment of inertia permits higher torque with lower power consumption, and the use of rod-like auxiliary poles 20 and 21 help compensate for torque reduction from reduced permanent magnet mass.

Inasmuch as the present invention is subject to many variations, modifications and changes in detail, it is intended that all subject matter discussed above or shown in the accompanying drawings be interpreted as illustrative and not in a limiting sense.

What is claimed is:

1. A single phase stepper motor comprising
    stator means including a body of diamagnetic or paramagnetic material, a field winding disposed in said body for producing an excitation field, and two diametrically opposed auxiliary poles spaced from said excitation field;
    rotor means including a shaft carrying a driving pinion and a bipolar permanent magnet; and
    bearing means rotatably supporting said rotor means in said stator body with the axis of said rotor shaft transverse to the direction of said excitation field, said permanent magnet being constructed of a lanthanide ferromagnetic alloy and having a moment of inertia substantially the same as or less than the moment of inertia of the combination of said rotor shaft and said driving pinion.

2. A single phase stepper motor as recited in claim 1 wherein said permanent magnet is constructed of a lanthanide cobalt alloy.

3. A single phase stepper motor as recited in claim 2 wherein said permanent magnet is constructed of a samarium cobalt alloy.

4. A single phase stepper motor as recited in claim 1 wherein the moment of inertia of said permanent masnet is less than the moment of inertia of the combination of said rotor shaft and said driving pinion.

5. A single phase stepper motor as recited in claim 1 wherein said rotor means includes holding plates for mounting said permanent magnet, and the moment of inertia of said permanent magnet is less than the moment of inertia of the combination of said rotor shaft, said driving pinion and said holding plates.

6. A single phase stepper motor comprising
    stator means including a body of diamagnetic or paramagnetic material, a field winding disposed in said body for producing an excitation field, and a U-shaped, rod-like member having ends defining two diametrically opposed auxiliary poles spaced from said excitation field, aid stator body having first and second pairs of holes therein, each pair of holes symmetrically disposed relative to said excitation field and said U-shaped member being changeably mounted in either of said first or second pairs of holes;

rotor means including a shaft carrying a driving pinion and a bipolar permanent magnet; and bearing means rotatably supporting said rotor means in said stator body with the axis of said rotor shaft transverse to the direction of said excitation field, said permanent magnet being constructed of a lanthanide ferromagnetic alloy and having a moment of inertia substantially the same as or less than the moment of inertia of the combination of said rotor shaft and said driving pinion.

7. A single phase stepper motor as recited in claim 6 wherein said stator body has additional pairs of holes therein, each pair of holes symmetrically disposed relative to said excitation field to permit adjustment of the direction of rotation and torque of said rotor means.

8. A single phase stepper motor as recited in claim 1 wherein said stator body is divided into two parts along a plane transverse to the axis of said rotor shaft, said parts each having facing recesses therein forming a cavity for accommodating said permanent magnet, and said bearing means is disposed within said stator body.

9. A single phase stepper motor as recited in claim 8 wherein said bearing means includes a bearing support disposed in each of said stator body parts.

10. A single phase stepper motor as recited in claim 8 wherein one of said stator body parts has a tubular extension and said bearing means includes a pair of longitudinally spaced bearing supports disposed in said tubular portion.

11. A single phase stepper motor as recited in claim 1 wherein said stator means includes an annular screen of ferromagnetic material.

* * * * *

UNITED STATES PATENT AND TRADEMARK OFFICE
CERTIFICATE OF CORRECTION

PATENT NO. : 4,138,617
DATED : February 6, 1979
INVENTOR(S) : Roland Sudler

It is certified that error appears in the above-identified patent and that said Letters Patent are hereby corrected as shown below:

column /73/ Assignee's name to read: -- QUARZ-ZEIT AG --

Signed and Sealed this

Nineteenth Day of June 1979

[SEAL]

Attest:

RUTH C. MASON
Attesting Officer

DONALD W. BANNER
Commissioner of Patents and Trademarks